United States Patent
Chiu

(10) Patent No.: US 7,567,331 B2
(45) Date of Patent: Jul. 28, 2009

(54) LIQUID CRYSTAL DISPLAY

(75) Inventor: Hsien-Ching Chiu, Tao-Yuan Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 450 days.

(21) Appl. No.: 11/307,420

(22) Filed: Feb. 7, 2006

(65) Prior Publication Data

US 2007/0182913 A1  Aug. 9, 2007

(51) Int. Cl.
*G02F 1/1339* (2006.01)
*G02F 1/1343* (2006.01)

(52) U.S. Cl. .................. 349/156; 349/106; 349/139; 349/140

(58) Field of Classification Search .......... 349/106, 349/108, 139–140, 149, 155–156
See application file for complete search history.

(56) References Cited

U.S. PATENT DOCUMENTS

2005/0248712 A1* 11/2005 Higa et al. ................ 349/155
2006/0066766 A1* 3/2006 Tanaka et al. ............. 349/44

FOREIGN PATENT DOCUMENTS

| JP | 2001-242467 | 9/2001 |
|---|---|---|
| JP | P2003-84289 A | 3/2003 |
| JP | 2003-140159 | 5/2003 |
| JP | P2003-131238 A | 5/2003 |
| JP | P2003-207788 A | 7/2003 |

* cited by examiner

*Primary Examiner*—Frank G Font
*Assistant Examiner*—Michael P Mooney
(74) *Attorney, Agent, or Firm*—Winston Hsu

(57) ABSTRACT

A liquid crystal display includes a lower substrate; an upper substrate disposed in parallel above the lower substrate; a plurality of wires disposed on the upper surface of the lower substrate, in which the wires further include a plurality of shrinking patterns and hollow patterns; a plurality of photo spacers disposed over the lower surface of the upper substrate for supporting the gap between the upper substrate and the substrate, in which the photo spacers are disposed corresponding to the shrinking patterns and hollow patterns; and a liquid crystal layer filled between the upper substrate and the lower substrate.

21 Claims, 16 Drawing Sheets

LIQUID CRYSTAL DISPLAY

BACKGROUND OF THE INVENTION

1. Field of the Invention

The invention relates to a liquid crystal display, and more particularly, to a liquid crystal display having uniform photo spacers and a method for fabricating the same.

2. Description of the Prior Art

Since liquid crystal displays (LCDs) have the advantages of portability, low power consumption, and low radiation, the LCDs have been widely used in various portable information products, such as notebooks, personal digital assistants (PDAs), video cameras, and etc. Furthermore, the LCD even has a potential to replace the CRT monitor or the television gradually.

In the conventional thin film transistor liquid crystal display (TFT-LCD) process, spacers, such as plastic beads, glass beads, or glass fibers, are positioned by spraying, and tend to be mal-distributed, for maintaining the thickness of the cell gap between two substrates of the TFT-LCD and controlling the cell gap to a specific value to ensure the display performance. Consequently, the contrast of the TFT-LCD is affected due to light scattering by the spacers that are positioned in the light transmitting regions, generating white point defects and reducing yield rates and the display performance. For this reason, photo spacers formed by a photolithographic process have been developed to replace the conventional plastic beads to control the dimensions and positions of the spacers and the uniformity of the cell gap accurately to raise the display performance.

Please refer to FIG. 1. FIG. 1 is a schematic diagram showing the structure of a liquid crystal display panel 10 according to the prior art. As shown in FIG. 1, the liquid crystal display panel 10 includes a lower substrate 22, an upper substrate 24, and a plurality of liquid crystals 26 filled between the lower substrate 22 and the upper substrate 24. The lower substrate 22 also includes a plurality of pixel electrodes 28 connecting to each thin film transistor (not shown) and an alignment layer 30, in which the pixel electrodes 28 are composed of transparent conductive material and the alignment layer 30 is disposed over the surface of the thin film transistors and the pixel electrodes 28 for controlling the initial arrangement of the liquid crystals 26. Additionally, the lower surface of the upper substrate 24 includes a plurality of black matrices 32, a plurality of color filters 34, a counter electrode 36 composed of a transparent conductive layer, and a plurality of photo spacers 38. Preferably, the color filters 34 comprise three kinds of color filters 34: red color filters 34a, green color filters 34b, and blue color filters 34c, in which the three kinds of color filters combine to form a pixel 20. The black matrices 32 are disposed on the border between each of the color filters 34 and the upper substrate 24. The counter electrode 36 covers over the surface of the color filters 34 to provide a voltage for the operation of the liquid crystal display panel 10. The photo spacers 38 are transparent or non-transparent minute columns, and they are used for replacing the spacers in the conventional liquid crystal display panel. The main consideration of the design of the distribution density of the photo spacers 38 is to arrange the photo spacers 38 uniformly in the whole plane of the liquid crystal display panel 10 to support the cell gap between the upper substrate 24 and the lower substrate 22, and at the same time adjust the height of the cell gap. The process of fabricating the liquid crystal display panel 10 according to the prior art involves forming the photo spacer 38 on the counter electrode 36 by a lithography process after depositing the counter electrode 36 on the bottom surface of the upper substrate 24. Additionally, the lower surface of the upper substrate 24 can further include an alignment film to cover the surface of the counter electrode 36.

By utilizing photo spacers, the liquid crystal display is able to obtain a much more uniform cell gap and much better penetration and contrast, thereby increasing the effectiveness of the liquid crystal display. Nevertheless, when the upper substrate and the lower substrate are assembled, the misalignment and shifting phenomenon often occur and results in uneven distribution of the photo spacers and influence the performance of the liquid crystal display. In other words, when a force is applied to the display panel, the cell gap will not be able to return to its original height as a result of insufficient distribution area and deformation of the photo spacers. Hence, Japanese Patent Nos. 2003-131238, 2003-207788, and 2003-84289 have disclosed numerous methods of forming photo spacers with different heights within the cell gap to solve the problem of insufficient distribution area and deformation of the photo spacers. However, the Japanese patents described above are still unable to effectively solve the shifting phenomenon problem when the upper substrate and the lower substrate are assembled. Moreover, two photomasks have to be utilized in the fabrication process to achieve the height difference effect within the cell gap, thereby increasing fabrication time and cost.

SUMMARY OF THE INVENTION

It is therefore an objective of the present invention to provide a liquid crystal display to solve the above-mentioned problems.

According to the present invention, a liquid crystal display comprises a lower substrate; an upper substrate disposed in parallel above the lower substrate; a plurality of wires disposed on the upper surface of the lower substrate, wherein the wires further comprise a plurality of shrinking patterns and hollow patterns; a plurality of photo spacers disposed over the lower surface of the upper substrate for supporting the gap between the upper substrate and the lower substrate, wherein the photo spacers are disposed corresponding to the shrinking patterns and hollow patterns; and a liquid crystal layer filled between the upper substrate and the lower substrate.

According to the present invention, a liquid crystal display comprises a lower substrate; an upper substrate disposed in parallel above the lower substrate; a plurality of wires disposed on the upper surface of the lower substrate, wherein the wires further comprise a plurality of first patterns and second patterns; a plurality of photo spacers disposed over the lower surface of the upper substrate for supporting the gap between the upper substrate and the lower substrate, wherein the photo spacers are disposed corresponding to the first patterns and second patterns; and a liquid crystal layer filled between the upper substrate and the lower substrate.

By forming scan lines and data lines with a plurality of shrinking patterns and hollow patterns on the lower substrate of the liquid crystal display, the present invention is able to prevent the uneven distribution of the photo spacer area, which is commonly caused by the shifting phenomenon produced during the assembly of the upper substrate and the lower substrate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
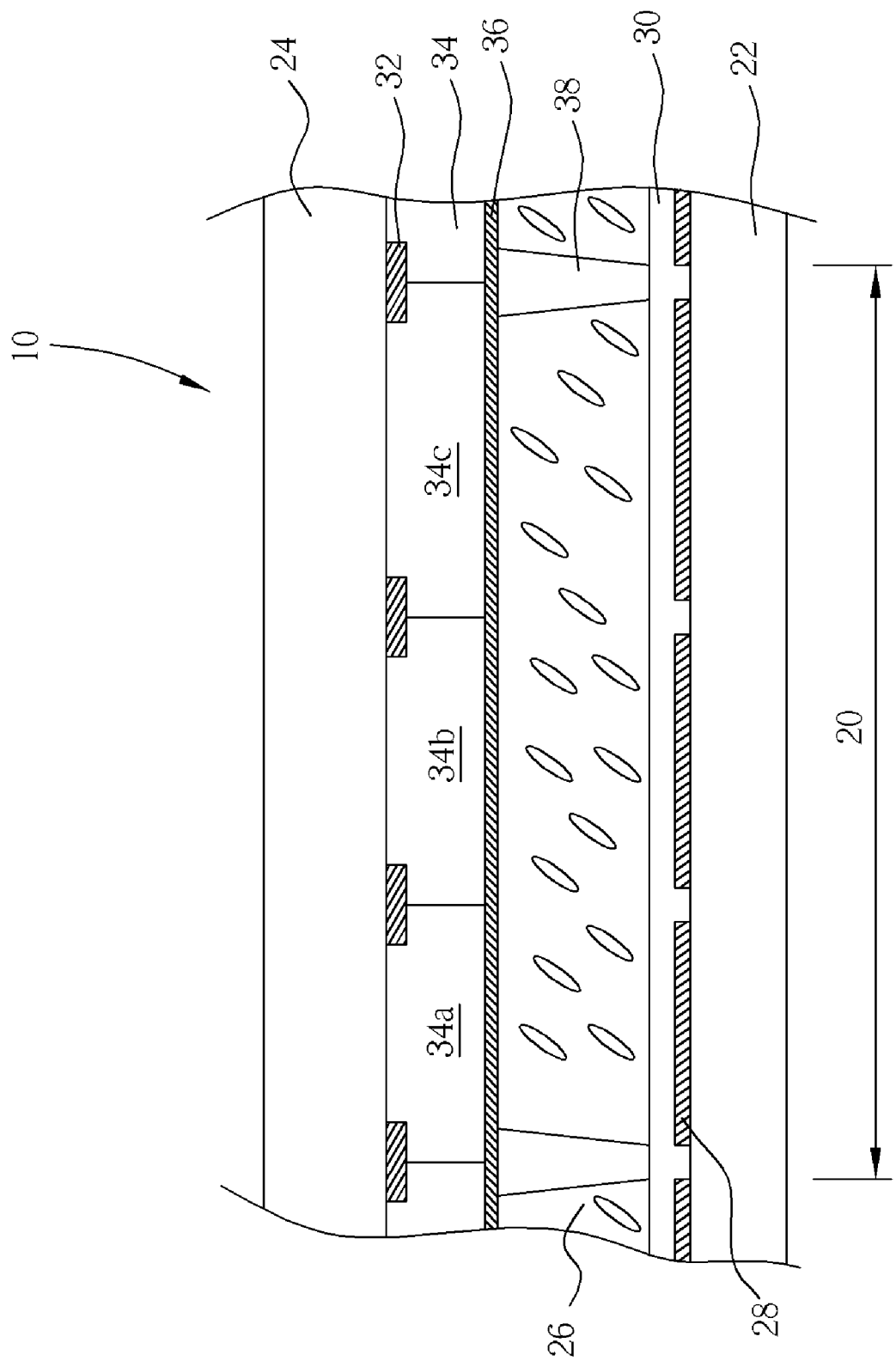
FIG. 1 is a schematic diagram showing the structure of a liquid crystal display panel according to the prior art.
Figure 2:
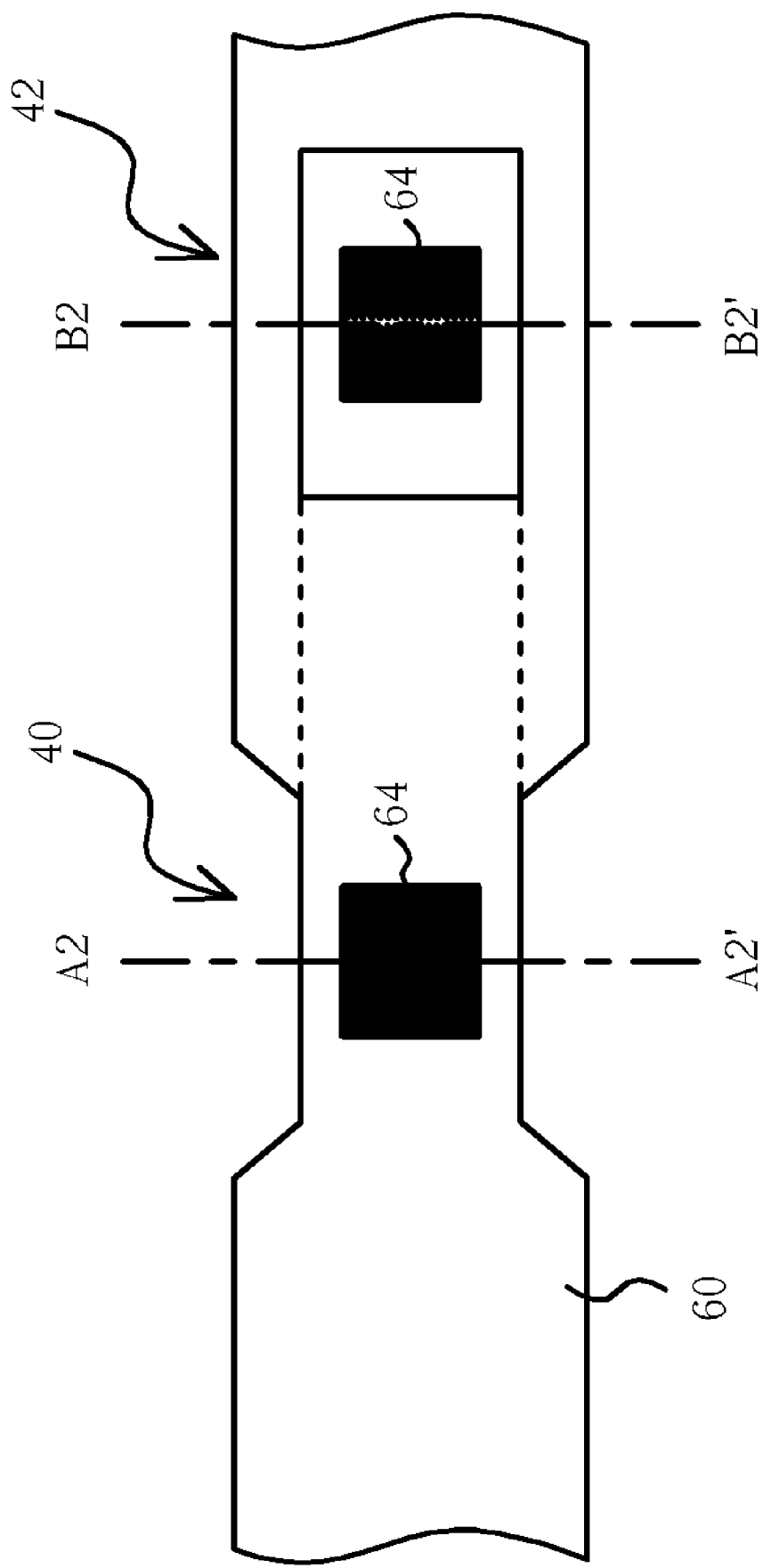
FIG. 2 is a top view diagram of a scan line according to the first embodiment of the present invention.
Figure 3:
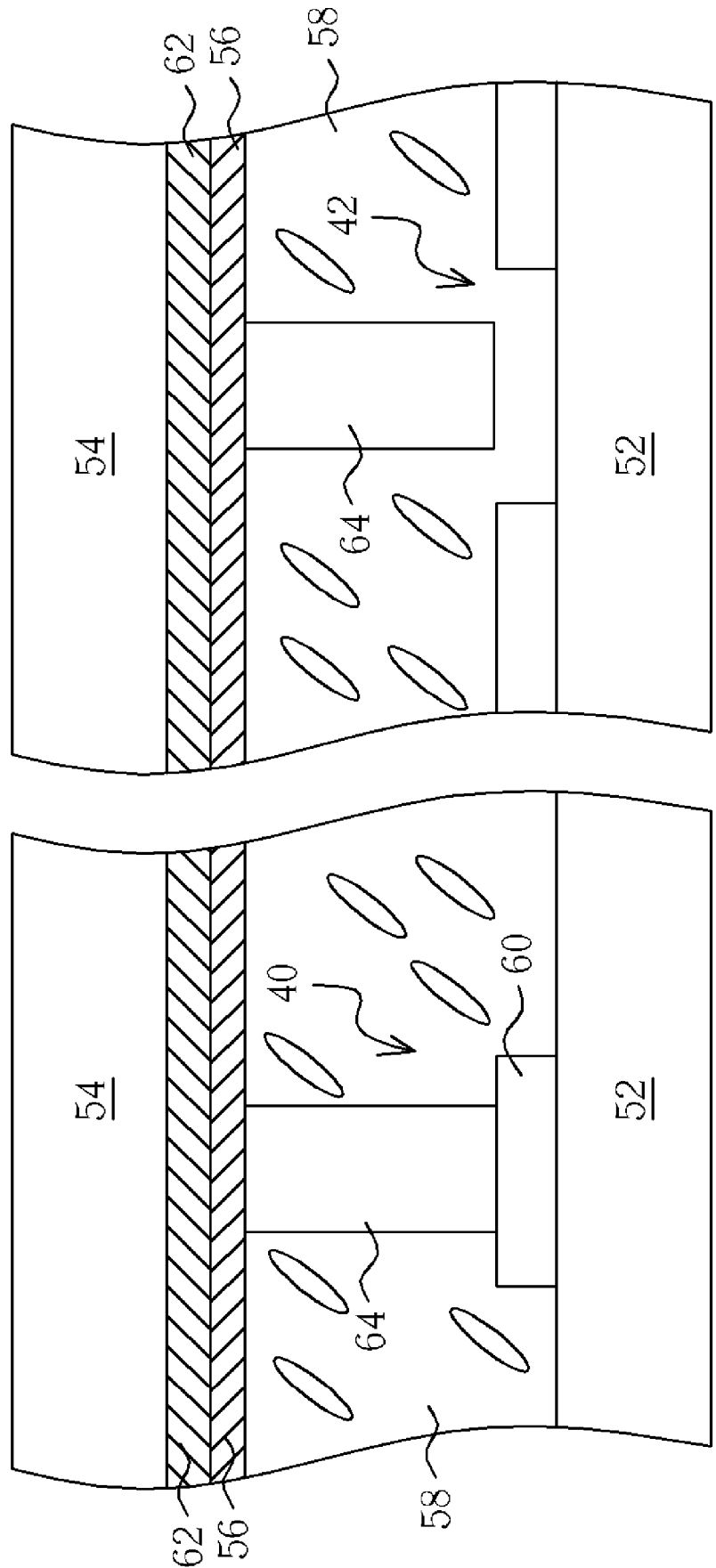
FIG. 3 is a cross-section diagram along the line A2A2' and B2B2' shown in FIG. 2.

Please refer to FIG. 2 and FIG. 3. FIG. 2 is a top view diagram of the scan line 60 according to the first embodiment of the present invention and FIG. 3 is a cross-section diagram along the line A2A2' and B2B2' shown in FIG. 2. As shown in FIG. 2 and FIG. 3, the liquid crystal display of the present invention includes a lower substrate 52, an upper substrate 54 disposed in parallel above the lower substrate 52, and a liquid crystal layer 58 filled between the lower substrate 52 and the upper substrate 54. Preferably, the lower substrate 52 is a TFT array substrate, in which the upper surface of the lower substrate 52 includes a plurality of scan lines 60, a plurality of thin film transistors (not shown) electrically connecting to the scan lines 60, and a plurality of data lines (not shown) for forming a plurality of sub pixels. The upper substrate 54 is a color filter substrate, in which the lower surface of the upper substrate 54 includes a plurality of color filters 62, a transparent conductive layer 56 composed of indium tin oxide (ITO) or indium zinc oxide (IZO) to serve as the counter electrode, and a plurality of photo spacers 64 corresponding to the scan lines 60 for supporting the gap between the upper substrate 54 and the lower substrate 52.

Preferably, the first embodiment of the present invention provides a shrinking pattern 40 (along the line A2A2') and a hollow pattern 42 (along the line B2B2') in the scan lines 60 of the lower substrate 52, in which the shrinking pattern 40 and the hollow pattern 42 are alternately disposed corresponding to the photo spacers 64. Ideally, the width between the edge of the shrinking pattern 40 and the corresponding shrinking edge of the scan lines 60 is equal to the width between the edge of the hollow pattern 42 and the edge of the scan lines 60. Additionally, the distance between the edge of the photo spacers 64 and the corresponding edge of the shrinking pattern 42 is less than the assembly shift of the upper substrate 54 and the lower substrate 52, and the distance between the edge of the photo spacers 64 and the corresponding edge of the hollow pattern 42 is also less than or equal to the assembly shift of the upper substrate 54 and the lower substrate 52. As a result, the present embodiment is able to effectively reduce the shifting phenomenon in the upper and lower direction after the upper substrate 54 and the lower substrate 52 are assembled.

Figure 4:
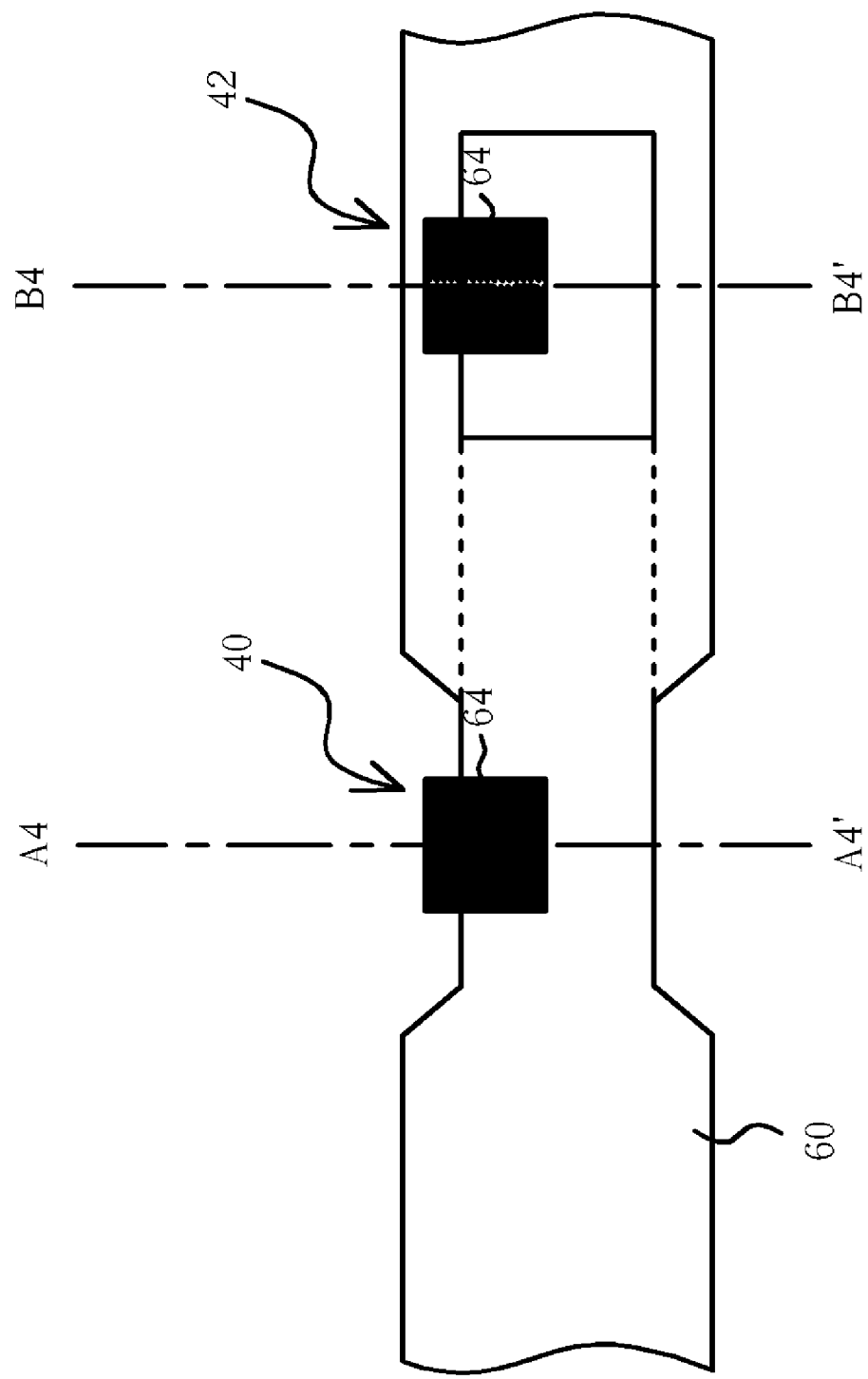
FIG. 4 is a top view diagram showing a shifting phenomenon in the upper direction of the scan lines of the liquid crystal display according to the first embodiment of the present invention.
Figure 5:
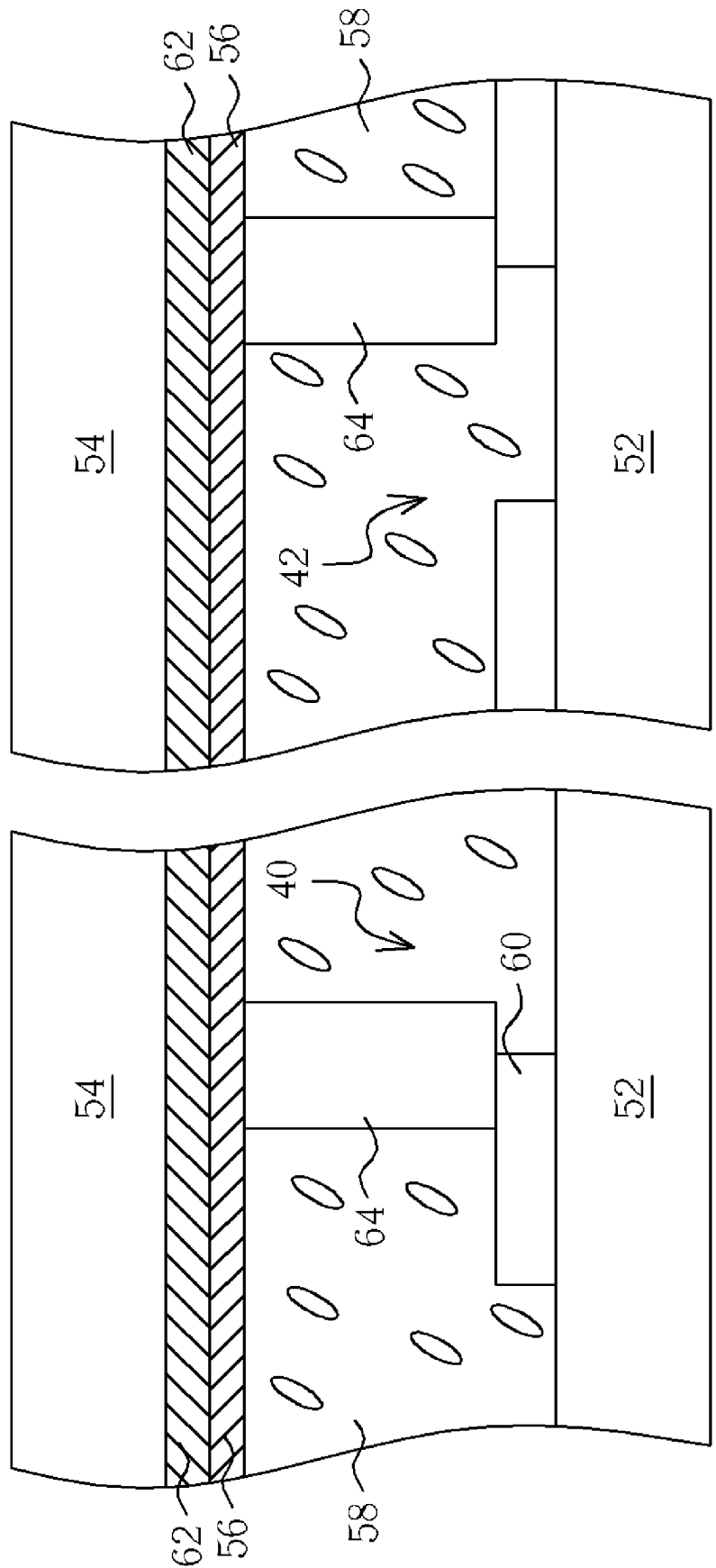
FIG. 5 is a cross section diagram along the line A4A4' and B4B4' shown in FIG. 4.
Figure 6:
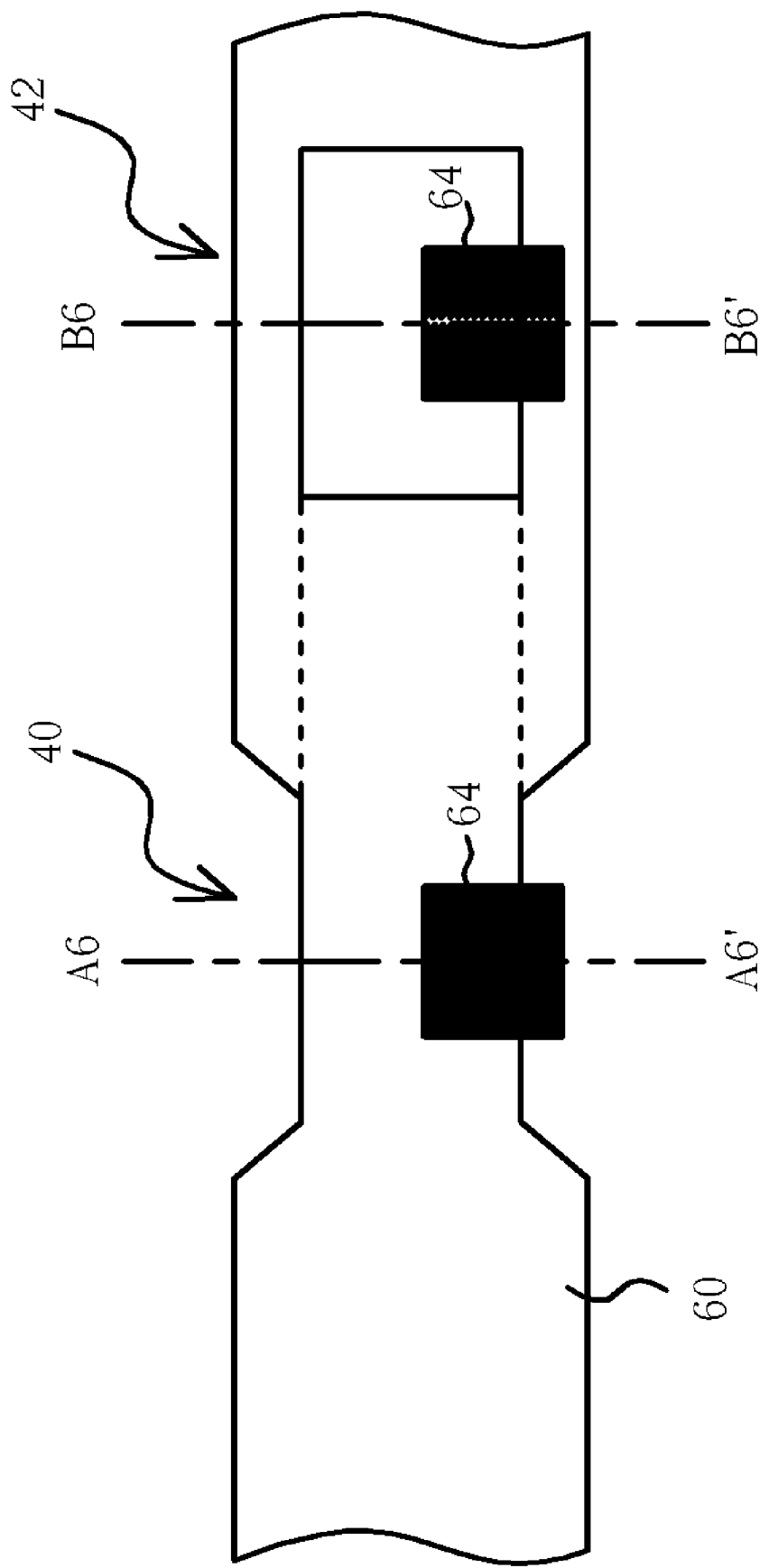
FIG. 6 is a top view diagram showing a shifting phenomenon in the lower direction of the scan lines of the liquid crystal display according to the first embodiment of the present invention.
Figure 7:
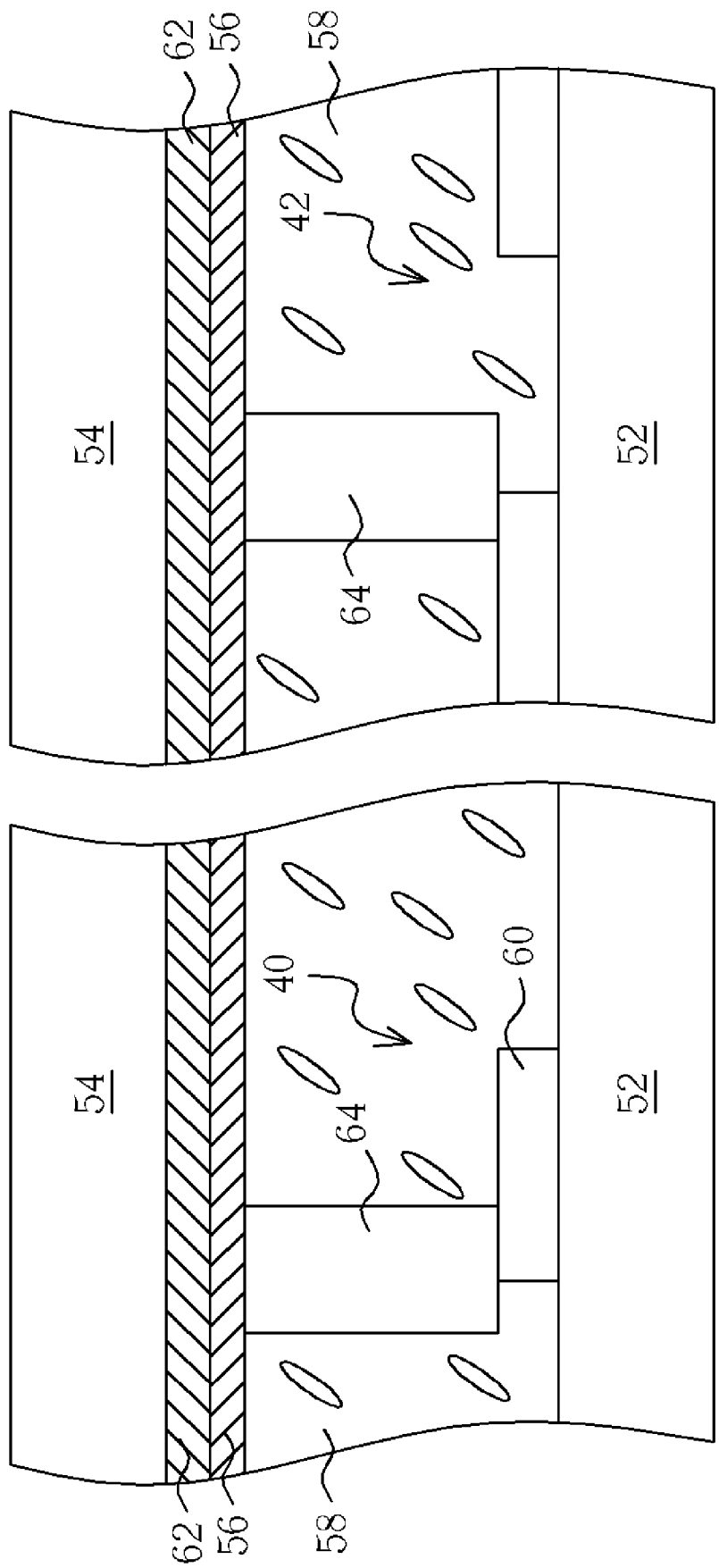
FIG. 7 is a cross section diagram along the line A6A6' and B6B6' shown in FIG. 6.

Please refer to FIG. 4 through FIG. 7. FIG. 4 is a top view diagram showing a shifting phenomenon in the upper direction of the scan lines of the liquid crystal display according to the first embodiment of the present invention and FIG. 5 is a cross section diagram along the line A4A4' and B4B4' shown in FIG. 4. FIG. 6 is a top view diagram showing a shifting phenomenon in the lower direction of the scan lines of the liquid crystal display according to the first embodiment of the present invention and FIG. 7 is a cross section diagram along the line A6A6' and B6B6' shown in FIG. 6. As shown in FIG. 4 through FIG. 7, by utilizing the combination of the shrinking pattern 40 and the hollow pattern 42 of the scan lines 60, the present embodiment is able to effectively control the uniformity of the photo spacer area in the vertical direction and prevent the conventional problem of uneven distribution of the photo spacers that is caused by shifting phenomenon in the upper and lower direction when the upper substrate and the lower substrate are assembled.

Figure 8:
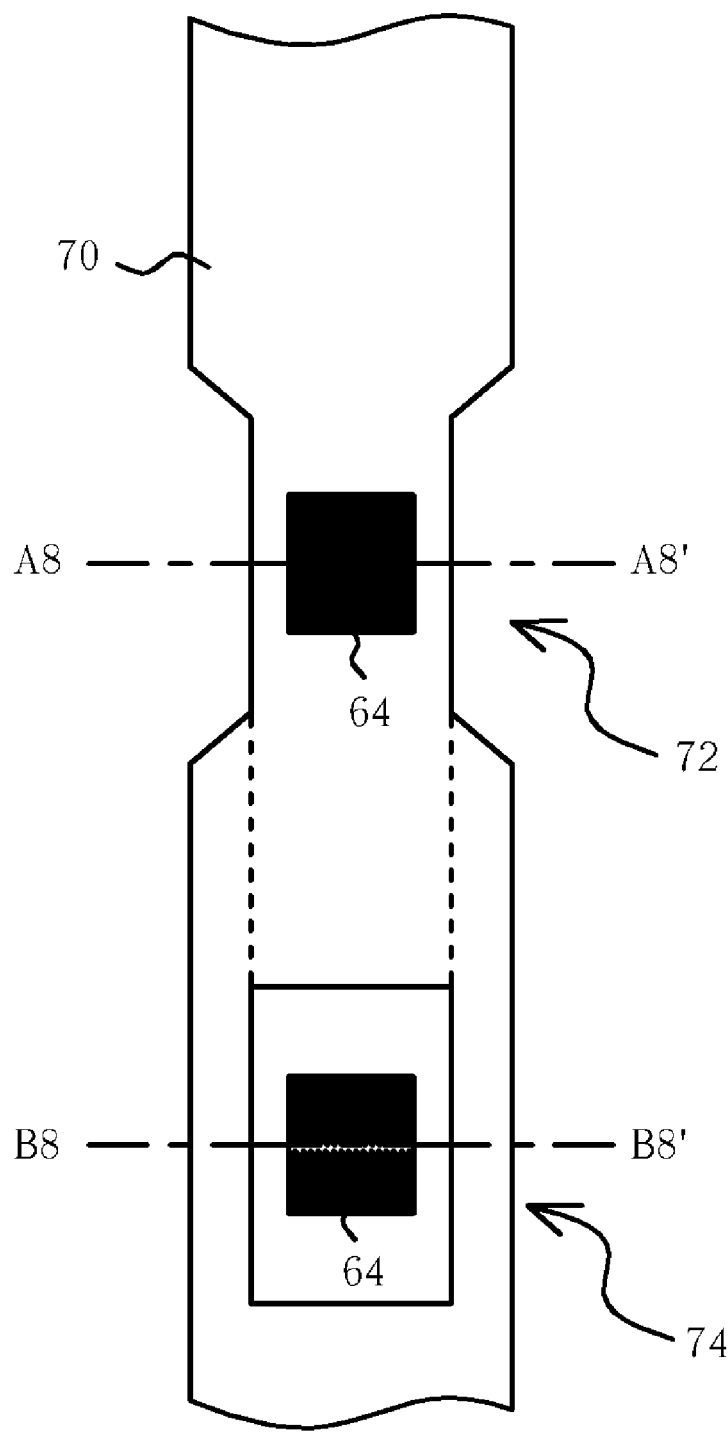
FIG. 8 is a top view diagram of the data line according to the second embodiment of the present invention.
Figure 9:
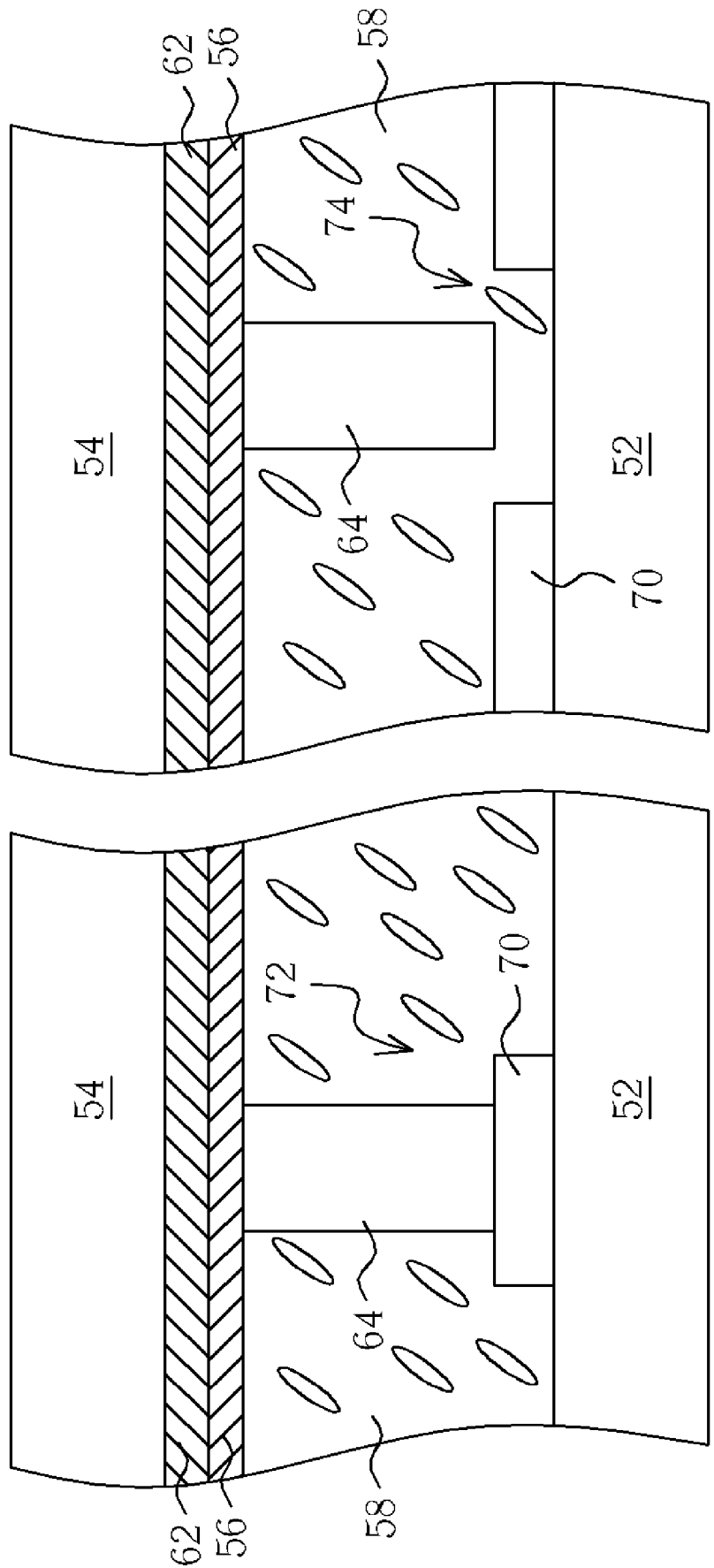
FIG. 9 is a cross section diagram along the line A8A8' and B8B8' shown in FIG. 8.

Please refer to FIG. 8 and FIG. 9. FIG. 8 is a top view diagram of the data line 70 according to the second embodiment of the present invention and FIG. 9 is a cross section diagram along the line A8A8' and B8B8' shown in FIG. 8. Similar to the method of forming a shrinking pattern 40 and a hollow pattern 42 in the scan lines 60 as discussed previously, the present invention also provides a shrinking pattern 72 and a hollow pattern 74 in the data lines 70 of the lower substrate 52, in which the shrinking pattern 72 and the hollow pattern 74 are alternately disposed and formed corresponding to the location of the photo spacers 64. Ideally, the width between the edge of the shrinking pattern 72 and the corresponding shrinking edge of the data lines 70 is equal to the width between the edge of the hollow pattern 74 and the edge of the data lines 70. Additionally, the distance between the edge of the photo spacers 64 and the corresponding edge of the shrinking pattern 72 is less than the assembly shift of the upper substrate 54 and the lower substrate 52, and the distance between the edge of the photo spacers 64 and the corresponding edge of the hollow pattern 74 is also less than or equal to the assembly shift of the upper substrate 54 and the lower substrate 52, thereby preventing the uneven distribution of the photo spacers 64 caused by the shifting phenomenon when the upper substrate 54 and the lower substrate 52 are assembled.

Figure 10:
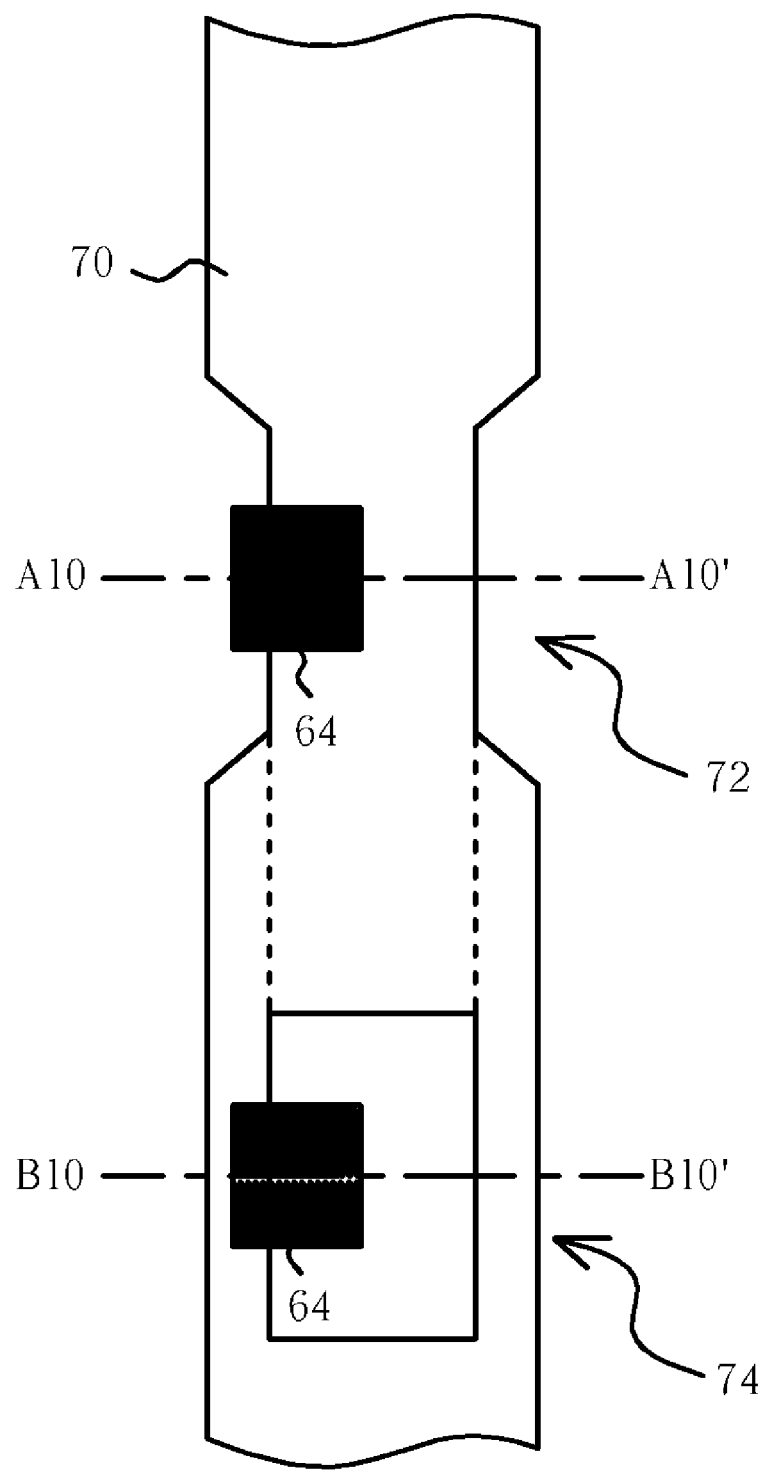
FIG. 10 is a top view diagram showing a shifting phenomenon in the left direction of the data lines of the liquid crystal display according to the second embodiment of the present invention.
Figure 11:
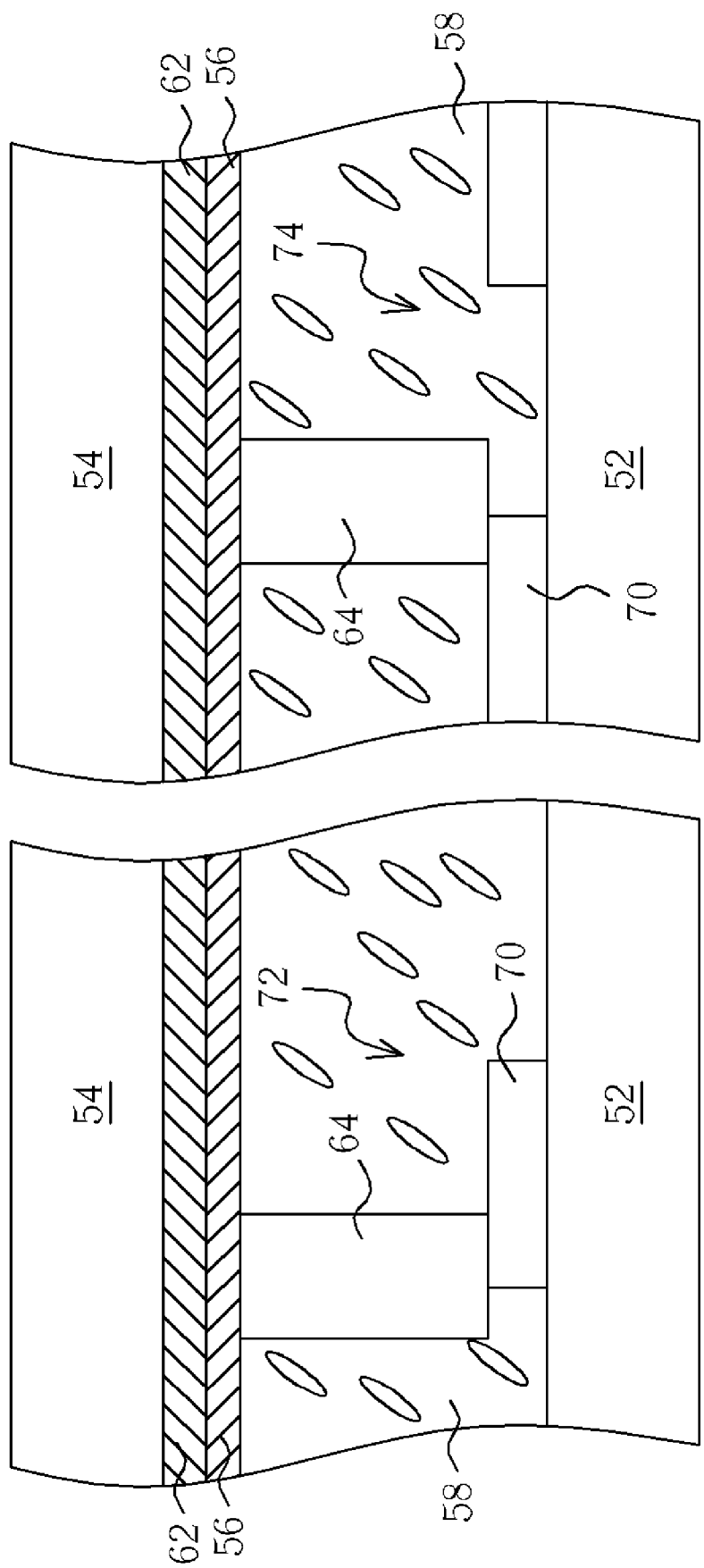
FIG. 11 is a cross section diagram along the line A10A10' and B10B10' shown in FIG. 10.
Figure 12:
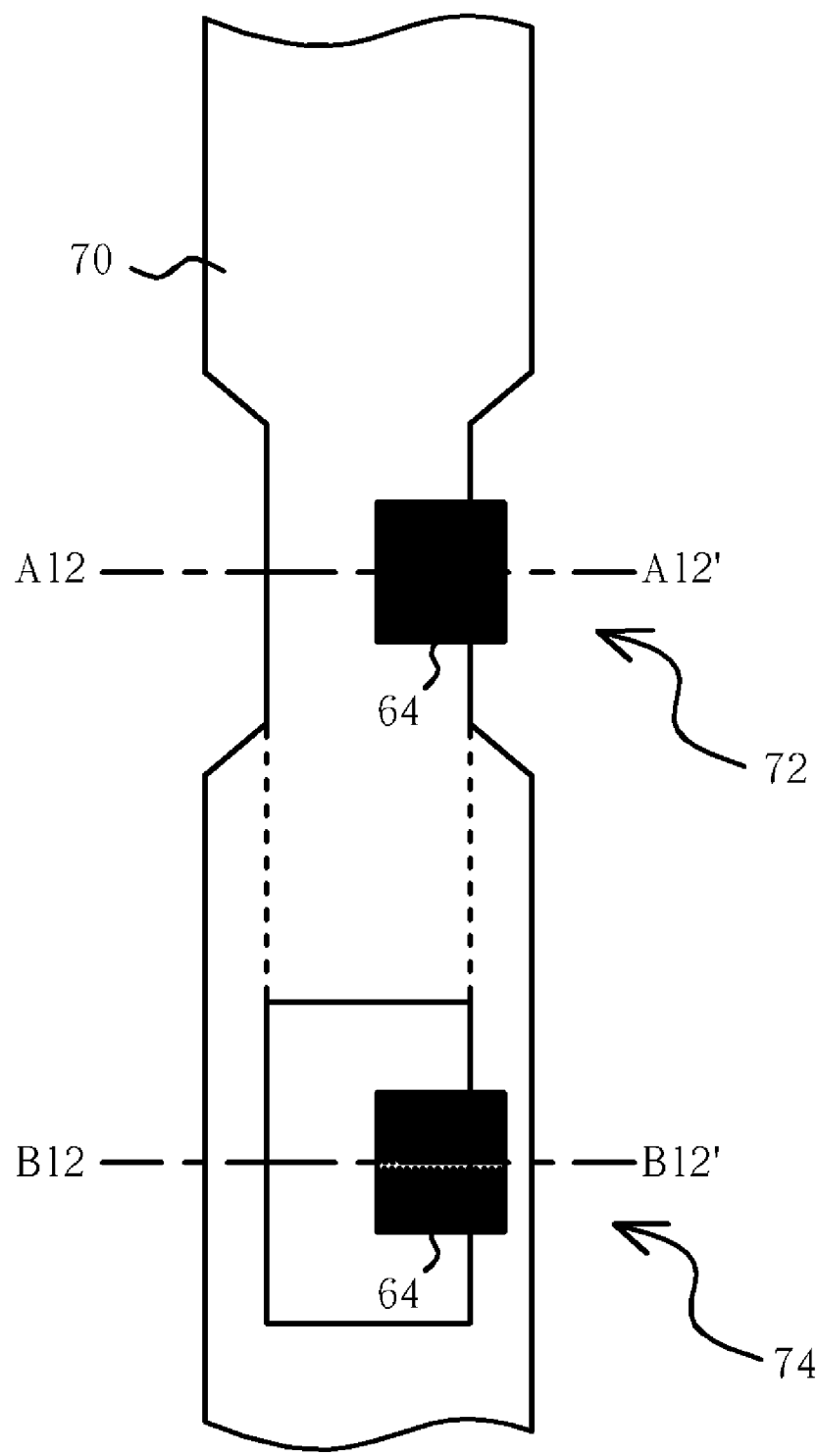
FIG. 12 is a top view diagram showing a shifting phenomenon in the right direction of the data lines of the liquid crystal display according to the second embodiment of the present invention.
Figure 13:
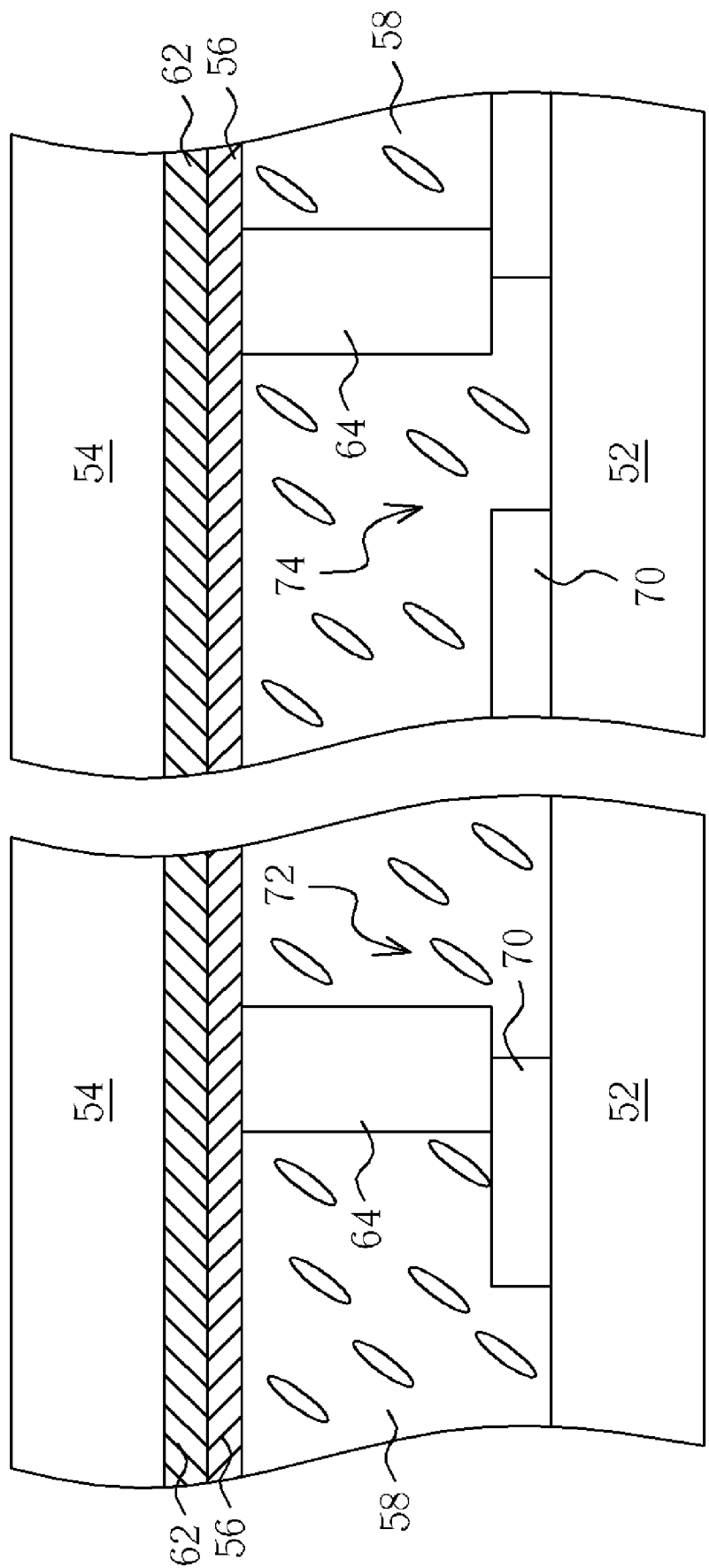
FIG. 13 is a cross section diagram along the line A12A12' and B12B12' shown in FIG. 12.

Please refer to FIG. 10 through FIG. 13. FIG. 10 is a top view diagram showing a shifting phenomenon in the left direction of the data lines 70 of the liquid crystal display according to the second embodiment of the present invention and FIG. 11 is a cross section diagram along the line A10A10' and B10B10' shown in FIG. 10. FIG. 12 is a top view diagram showing a shifting phenomenon in the right direction of the data lines 70 of the liquid crystal display according to the second embodiment of the present invention and FIG. 13 is a cross section diagram along the line A12A12' and B12B12' shown in FIG. 12. As shown in FIG. 10 through FIG. 13, shifting phenomenon occurs not only in the upper and lower direction as discussed previously, but also occurs in the left and right direction when the upper substrate 54 and the lower substrate 52 are assembled. By utilizing the combination of the shrinking pattern 72 and the hollow pattern 74 of the data lines 70, the present embodiment is able to effectively control the uniformity of the photo spacer area in the horizontal direction and prevent the conventional problem of uneven area distribution of the photo spacers that is caused by shifting phenomenon in the left and right direction when the upper substrate and the lower substrate are assembled.

Figure 14:
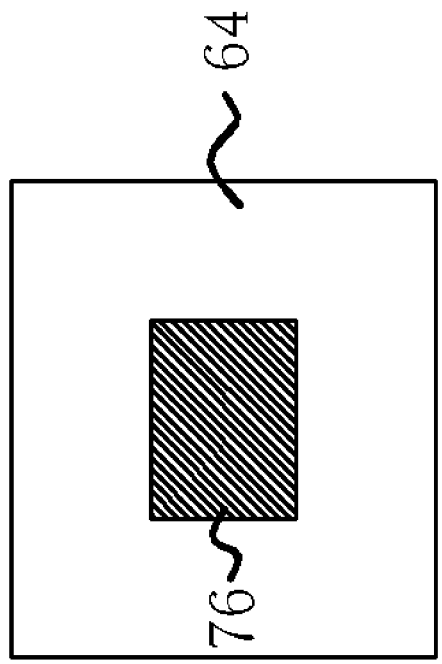
FIG. 14 is a perspective diagram showing the protruding structures and photo spacers according to the third embodiment of the present invention.
Figure 14:
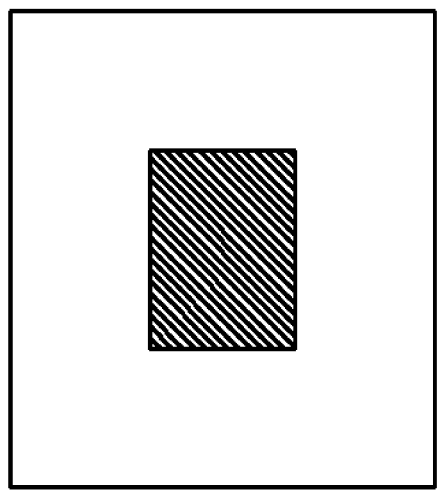
Figure 15:
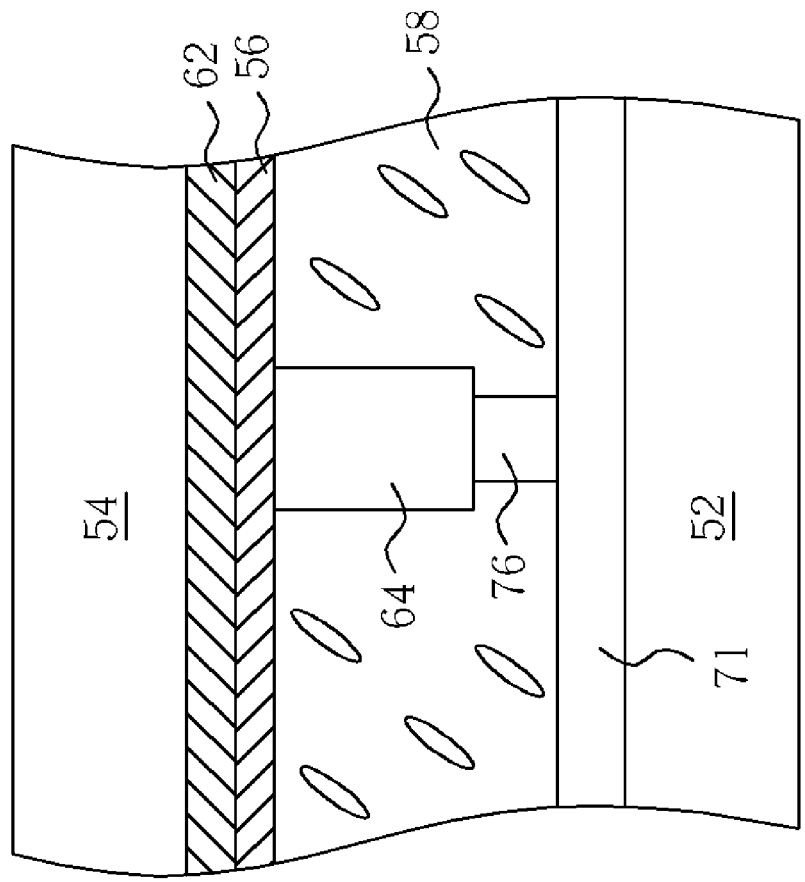
FIG. 15 is a top view diagram showing the protruding structures and photo spacers from FIG. 14.
Figure 15:
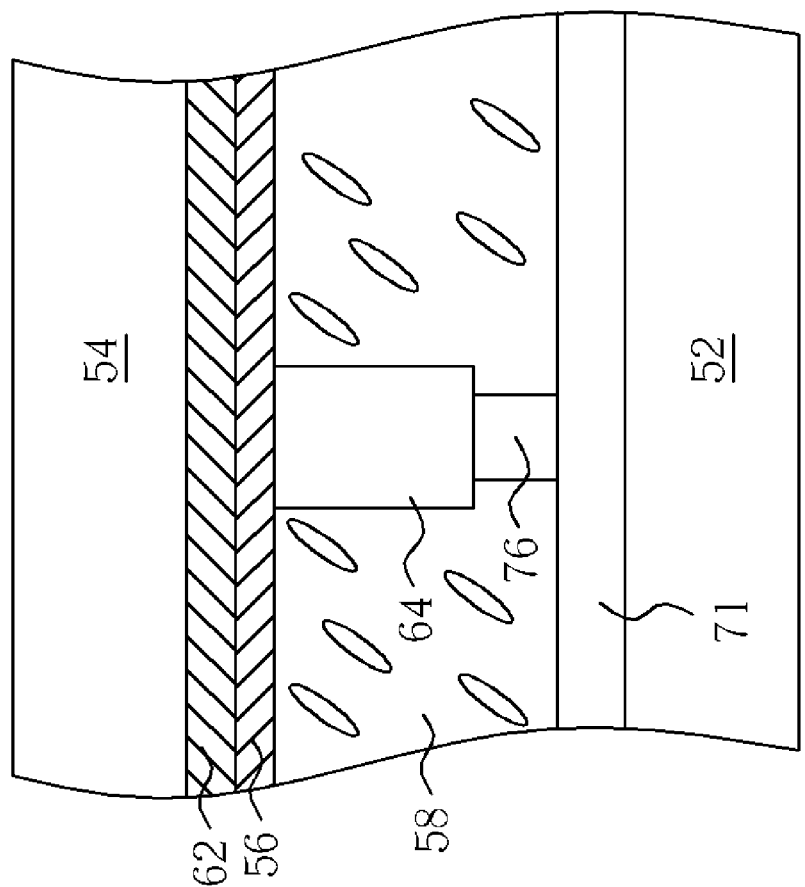

Please refer to FIG. 14 and FIG. 15. FIG. 14 is a perspective diagram showing the protruding structures and photo spacers according to the third embodiment of the present invention and FIG. 15 is a top view diagram showing the protruding structures and photo spacers from FIG. 14. As shown in FIG. 14 and FIG. 15, the present invention is able to form a plurality of extra protruding structure 76 from the photomask utilized in the fabrication of the lower substrate 52 to contact the photo spacers 64, in which the protruding structures 76 are equal in height and the photo spacers 64 corresponding to the upper substrate 54 are also equal in height. Preferably, the distance between the edge of the protruding structures 76 and the edge of the photo spacers 64 is greater than the assembly shift of the upper substrate 54 and the lower substrate 52 to prevent the uneven area distribution of the photo spacers 64 when the upper substrate 54 and the lower substrate 52 are assembled. As a result, the present embodiment is able effectively control the uniformity of the photo spacer area in both vertical and horizontal direction, thereby reducing the uneven area distribution of the photo spacers which is caused by the shifting phenomenon in both upper, lower, left, and right direction when the upper substrate and the lower substrate are assembled.

For instance, when the wire 71 corresponding to the lower substrate 52 is a scan line composed of a first metal layer, an isolated second metal layer can be alternately stacked on the scan line to form protruding structures 76 and when the wire 71 is a data line composed of a second metal layer, an isolated transparent conductive layer can be alternately stacked on the data line to form protruding structures 76. Preferably, material layers utilized in photo-etching processes (PEP) in the fabrication of thin film transistors can be utilized in various combinations to be alternately disposed on the wires described previously, such as stacking scan lines on the data lines, data lines on the scan lines, scan lines on the transparent conductive layer, and data lines on the transparent conductive layer, in which the layer stacked on top is utilized to form the protruding structures 76 contacting the photo spacers 64.

Figure 16:
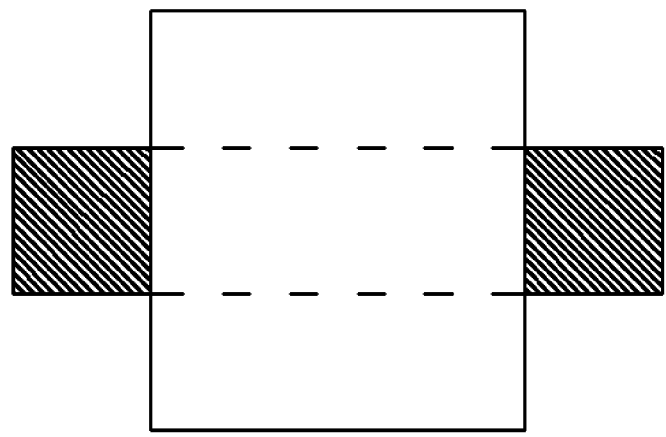
FIG. 16 is a top view diagram showing the assembly of the upper substrate and the lower substrate according to the fourth embodiment of the present invention.
Figure 16:
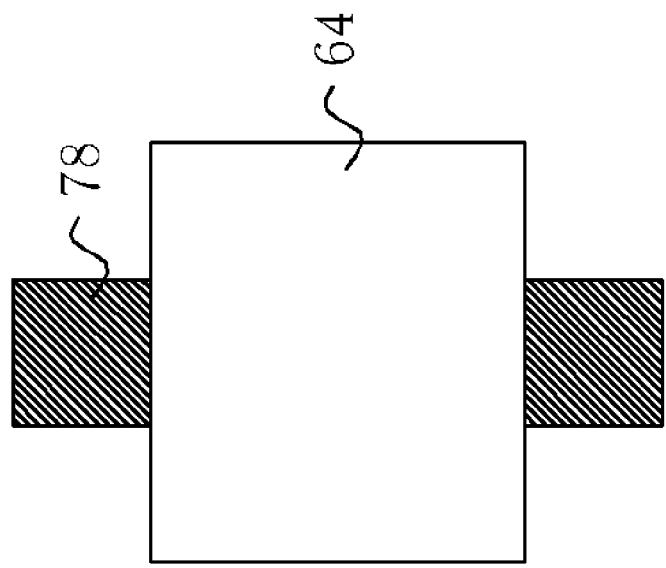

Please refer to FIG. 16. FIG. 16 is a top view diagram showing the assembly of the upper substrate and the lower substrate according to the fourth embodiment of the present invention. As shown in FIG. 16, a plurality of bar patterns 78 can be formed on the lower substrate 52 side, in which the bar patterns 78 are alternately disposed with the corresponding photo spacers 64 to facilitate the uniformity of the photo spacer area in the vertical direction. Additionally, the bar patterns 78 can also be disposed horizontally to maintain the uniformity of the photo spacer area in the horizontal direction and prevent the uneven distribution of the photo spacers from the shifting phenomenon when the upper substrate and the lower substrate are assembled. Preferably, the length of the non-contacted portion of the upper substrate 54 and the lower substrate 52 is greater than the assembly shift of the two substrates to prevent the uneven distribution of the photo spacers when the two substrates are assembled. In other words, the present embodiment mainly utilizes the difference in the shape of the protruding structures in the side of the corresponding lower substrate 52 to produce the same effect as the previous embodiment.

By forming scan lines and data lines with a plurality of shrinking patterns and hollow patterns on the lower substrate of the liquid crystal display, the present invention is able to prevent the uneven distribution of the photo spacer area, which is commonly caused by the shifting phenomenon produced during the assembly of the upper substrate and the lower substrate. Without adding extra fabrication time, cost, and number of photomasks, the present invention also enables the plurality of photo spacers within the cell gap to produce a different height effect, thereby improving problems such as a bubbling phenomenon caused during exposure to low temperatures and a black cell gap, which is produced when the substrates are being compressed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display comprising:
   a lower substrate;
   an upper substrate disposed in parallel above the lower substrate;
   a plurality of wires disposed on the upper surface of the lower substrate, wherein the wires further comprise a plurality of shrinking patterns and hollow patterns;
   a plurality of photo spacers disposed over the lower surface of the upper substrate for supporting the gap between the upper substrate and the lower substrate, wherein the photo spacers are disposed corresponding to the shrinking patterns and hollow patterns; and
   a liquid crystal layer filled between the upper substrate and the lower substrate.

2. The liquid crystal display of claim 1, wherein the width of the shrinking patterns and the hollow patterns is less than the assembly shift of the substrate.

3. The liquid crystal display of claim 1, wherein the width between the edge of the shrinking pattern and the corresponding shrinking edge of each wire equals the width between the edge of each hollow pattern and the edge of each wire.

4. The liquid crystal display of claim 1, wherein the distance between the edge of the photo spacers and the corresponding edge of each shrinking pattern is less than the assembly shift of the upper substrate and the lower substrate, and the distance between the edge of the photo spacers and the corresponding edge of each hollow pattern is less than the assembly shift of the upper substrate and the lower substrate.

5. The liquid crystal display of claim 1, wherein the lower substrate comprises an array substrate and the wires comprises scan lines and data lines.

6. The liquid crystal display of claim 1, wherein the lower substrate further comprises a plurality of thin film transistors for electrically connecting the scan lines.

7. The liquid crystal display of claim 1, wherein the upper substrate comprises a color filter substrate.

8. The liquid crystal display of claim 7 further comprising a plurality of color filters disposed between the lower surface of the upper substrate and the photo spacers.

9. The liquid crystal display of claim 8 further comprising a transparent conductive layer disposed between the color filters for serving as a counter electrode.

10. The liquid crystal display of claim 9, wherein the transparent conductive layer comprises indium tin oxide or indium zinc oxide.

11. A liquid crystal display comprising:
a lower substrate;
an upper substrate disposed in parallel above the lower substrate;
a plurality of wires disposed on the upper surface of the lower substrate, wherein the wires further comprise a plurality of first patterns and second patterns;
a plurality of photo spacers disposed over the lower surface of the upper substrate for supporting the gap between the upper substrate and the lower substrate, wherein the photo spacers are disposed corresponding to the first patterns and second patterns; and
a liquid crystal layer filled between the upper substrate and the lower substrate.

12. The liquid crystal display of claim 11, wherein the lower substrate comprises an array substrate and the wires comprises scan lines and data lines.

13. The liquid crystal display of claim 11, wherein each of the first patterns is a shrinking pattern, each of the second patterns is a hollow pattern, and the width between the edge of the shrinking pattern and the corresponding shrinking edge of each wire equals the width between the edge of each hollow pattern and the edge of each wire.

14. The liquid crystal display of claim 13, wherein the distance between the edge of the photo spacers and the corresponding edge of each shrinking pattern is less than the assembly shift of the upper substrate and the lower substrate, and the distance between the edge of the photo spacers and the corresponding edge of each hollow pattern is less than the assembly shift of the upper substrate and the lower substrate.

15. The liquid crystal display of claim 11, wherein each of the first patterns and each of the second patterns comprise a protruding pattern and the first patterns and the second patterns have an equal thickness.

16. The liquid crystal display of claim 15, wherein the distance between the edge of each protruding pattern and the edge of the photo spacers is greater than the assembly shift of the upper substrate and the lower substrate.

17. The liquid crystal display of claim 11, wherein the lower substrate further comprises a plurality of thin film transistors for electrically connecting to the scan lines.

18. The liquid crystal display of claim 11, wherein the upper substrate comprises a color filter substrate.

19. The liquid crystal display of claim 18 further comprising a plurality of color filters disposed between the lower surface of the upper substrate and the photo spacers.

20. The liquid crystal display of claim 19 further comprising a transparent conductive layer disposed between the color filters for serving as a counter electrode.

21. The liquid crystal display of claim 20, wherein the transparent conductive layer comprises indium tin oxide and indium zinc oxide.

* * * * *